No. 804,876. PATENTED NOV. 21, 1905.
E. I. NOXON.
APPARATUS FOR DRYING AND STERILIZING CEREALS.
APPLICATION FILED JUNE 14, 1905.

3 SHEETS—SHEET 3.

Witnesses
M. E. Johnson
Gladys Walton

Inventor:
Edwin I. Noxon,
By Hugh K. Wagner,
His Attorney.

UNITED STATES PATENT OFFICE.

ELWIN I. NOXON, OF ST. LOUIS, MISSOURI.

APPARATUS FOR DRYING AND STERILIZING CEREALS.

No. 804,876. Specification of Letters Patent. Patented Nov. 21, 1905.

Application filed June 14, 1905. Serial No. 265,122.

*To all whom it may concern:*

Be it known that I, ELWIN I. NOXON, a citizen of the United States, residing at the city of St. Louis, State of Missouri, have invented certain new and useful Improvements in Apparatuses for Drying and Sterilizing Cereals, of which the following is a specification.

This invention relates to means for drying and sterilizing cereals in a granular form, and specifically to a process for insuring greater convenience and regularity in such treatment, whereby all of the granular particles are treated alike, and mechanical means for carrying out said process.

Figure 1:
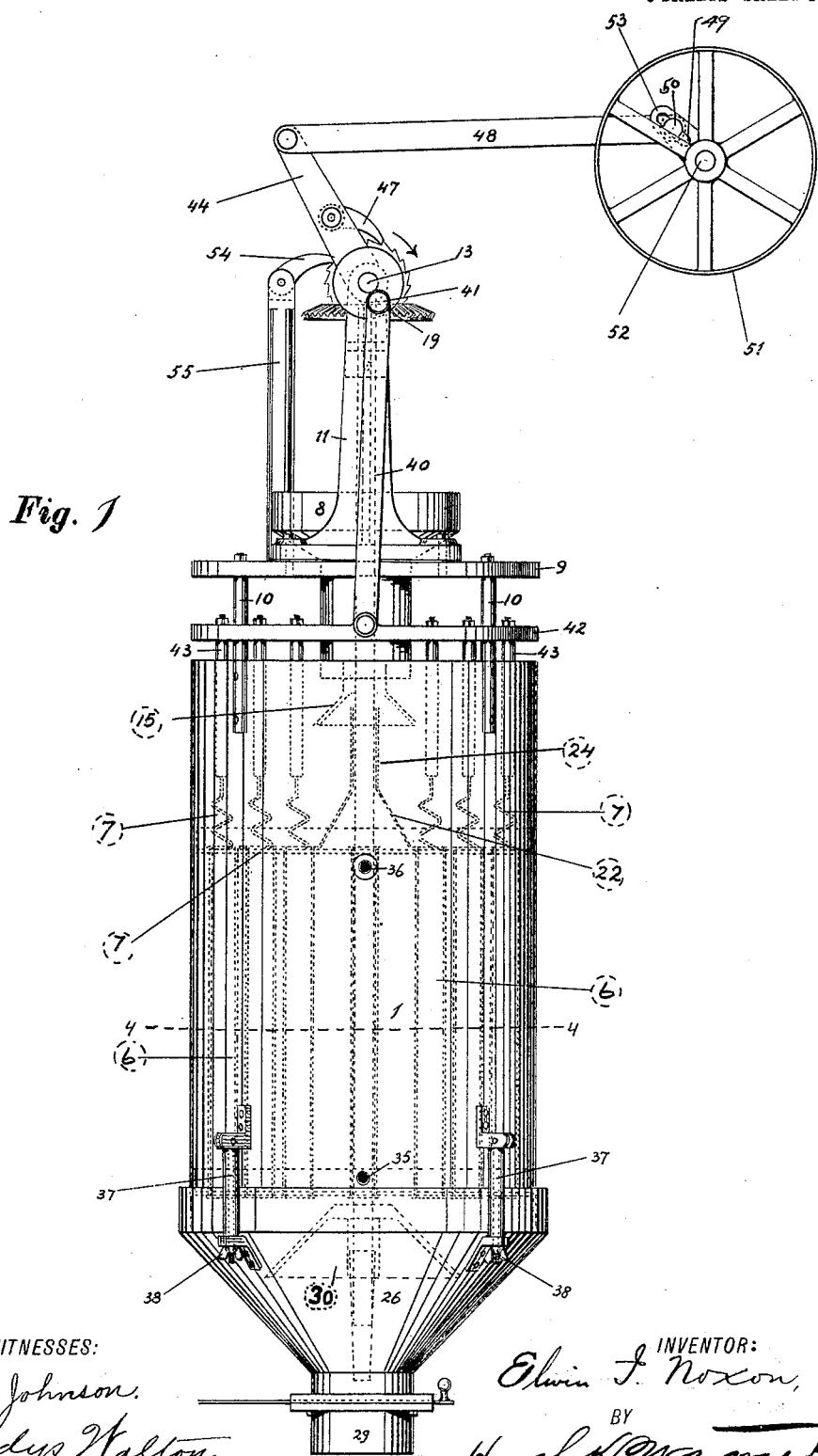
Figure 2:
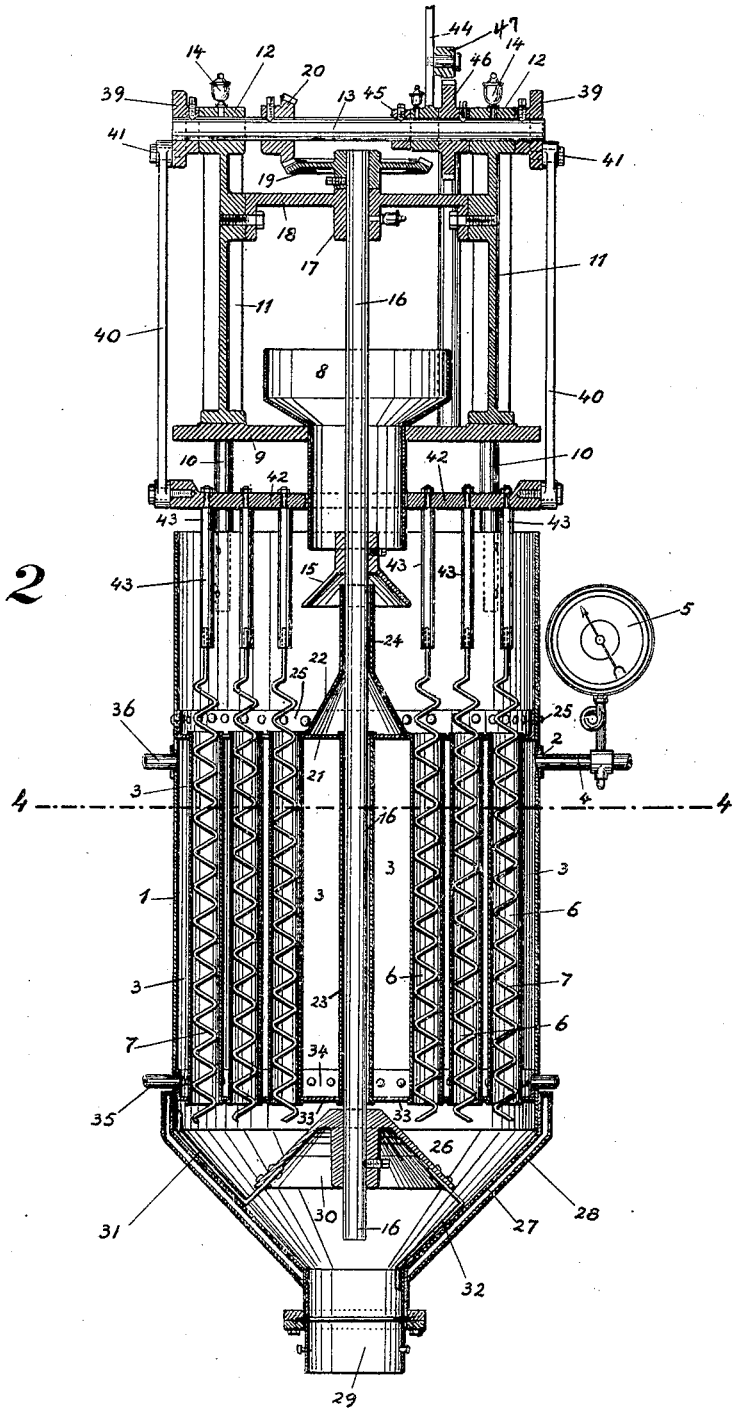
Figure 3:
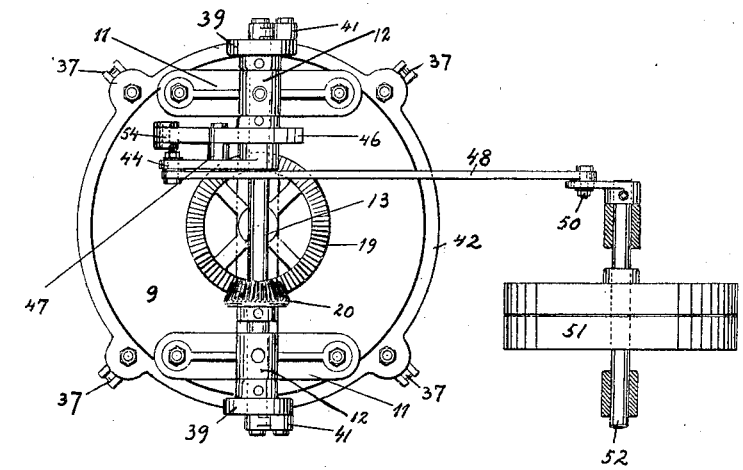
Figure 4:
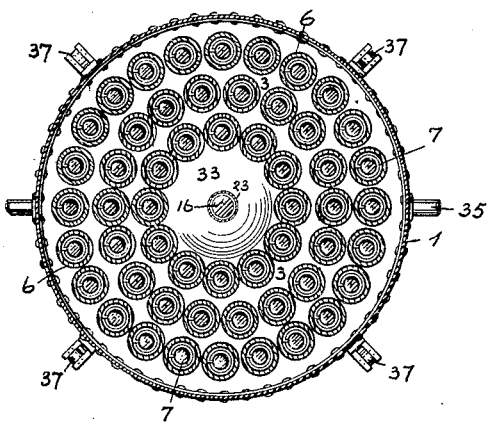

In the drawings accompanying this specification and forming part thereof, in which like numbers of reference denote like parts wherever they occur, Figure 1 is a side elevation. Fig. 2 is a vertical section. Fig. 3 is a top plan view; and Fig. 4 is a sectional view on the line 4 4, Fig. 1.

In former years it was the universal experience of millers, wholesalers, jobbers, and retailers of prepared cereal products, such as rolled oats, so-called "breakfast-foods," and the like, and it was the experience of housekeepers also, that in summer-time the same would be found to contain weevils and other insects which had developed from germs or bacteria or larvæ which to a greater or less extent had remained dormant during cold weather. This to a large extent had the effect of causing such articles to be regarded as suitable food only for the winter months, while as a matter of fact no inherent objection existed to their consumption in summer-time as well as winter. The presence of insect life is objectionable at all times, however, and it will be obvious that unless the product is absolutely freed therefrom by the extermination of all forms thereof, whether developed or merely in germ form, the objection will remain. The existence of any germs in such a product will result in their propagation and development when favorable conditions of temperature surround them. To prevent this, it is important that absolute sterilization of the product shall take place before it leaves the manufacturer's hands. If, for instance, more than ninety-nine per cent. of a miller's product is completely sterilized, but a fraction of one per cent. thereof contains some germs, the reanimation and development of said germs when the goods have been shipped to distant places will not only cause individual packages in the retailer's stock to become alive with animalcules, and thereby ruin the reputation of the particular brand of goods, but also the presence of animal or germ life in this form in a single package will cause its propagation in the remainder of the grocer's stock, or a large portion thereof, and thus produce large loss. From this it will be evident that any improvement tending to produce better or complete sterilization of such products is of the highest importance.

My improved process consists in agitating such products while the same are being sterilized so that all parts of a given quantity are equally subjected to the sterilizing influence—such as, for instance, heat applied in the form of steam or otherwise. It is obvious that if a cereal product in a granular condition were fed by ordinary means in a path past or adjacent to such sterilizing means some particles would be in closest contact therewith, while others would not so immediately adjoin same. Some at least of the last-named particles would therefore escape adequate contact with said sterilizing means and the germs accompanying same would not be properly affected thereby. From this would result in the manner hereinabove described the dissemination of packages of the product containing incipient insect life, with all the attendant disadvantages indicated above.

My improvement in processes of sterilizing cereals consists, therefore, in the agitation thereof while undergoing the sterilizing treatment, which may consist of the stirring, mixing, rocking, shaking, or other manipulation thereof to produce such agitation of all the particles as to bring them without exception directly and adequately into such close contact with or juxtaposition to the sterilizing means as thoroughly to eliminate and exterminate the germs.

I shall hereinafter describe my preferred form of apparatus for carrying out the hereinabove-described process, it being understood that the article to be treated is a comminuted cereal product, preferably in small granular form. While larger grains might run through the tubes of my apparatus without choking same, yet when very fine grains or particles are fed therethrough such impedance is also prevented by the apparatus hereinafter described.

The metal casing 1 is preferably cylindrical in shape and is formed with an aperture 2, through which steam is admitted into the steam-space 3 from the steam-pipe 4, leading from a suitable source of supply, to which pipe 4, if desired, may be attached a steam-gage 5.

36 denotes an additional steam or heat inlet, which may be used when enough steam cannot be introduced through pipe 4 or when it is desired to introduce steam from both sides of the casing 1 at the same time.

Within the casing 1 a plurality of vertical feed-tubes 6 is located, each of same containing within it an agitator, clearly shown in the drawings as consisting of a reciprocating spiral wire 7.

The granular product is fed into the hopper 8, which is mounted upon the frame 9, which by supports 10 is borne by the casing 1 and itself sustains the standards 11, containing the bearings 12 for the operating-shaft 13. Oil-cups 14 surmount the bearings 12.

When the grain is fed into the hopper 8, it passes by gravity through same and falls upon the rotary deflector-plate 15, which is fixed to the vertical shaft 16, which passes through the hopper 8 and also through the cross-head 17, supported by the cross-bar 18, borne by the standards 11. Fixed to the vertical shaft 16 is the miter-gear 19, which meshes with the gear 20, which in turn is fixed to the operating-shaft 13, from which the shaft 16 thus derives rotary motion.

The deflector-plate 15 causes the granular product to fall away from the center and feed into the various tubes 6, which are spaced apart, so as to allow a steam-space between and around them all, there being also a larger central steam-space in that portion of cylinder 1 immediately surrounding the shaft 16. The article being treated is prevented from falling into any part of the steam-space 3 by the plate 21, which covers same and through which the several tubes 6 project. A second deflector 22, located underneath the deflector 15, keeps the article being treated away from the shaft 16, and the tube 23, through which same passes, being provided with a sleeve 24, which encircles the shaft 16 and projects upward into the funnel of the deflector 15. The vertically-reciprocating agitators 7 cause the granular product to feed downwardly through the tubes 6 out of the space within the cylinder or casing 1 above the plate 21. The plate 21 is provided with the flange 25, by which the same is riveted to the casing 1.

As the article to be sterilized passes through the tubes 6 it is subjected to the drying and sterilizing heat of the steam filling the steam-space 3, which completely surrounds each one of the tubes 6, as clearly shown in Fig. 4, and the vertically-reciprocating movement of the spiral wires 7 causes all particles of the product thus fed through the tubes 6 to get in contact with the walls of said tubes 6, and thus equally to receive the sterilizing benefit of the heat of said steam-space. By this means when the same makes its exit through the bottom openings of the tubes 6 all particles have been equally and properly sterilized. Thereupon the product falls into the hopper 26, which is provided with double walls 27 and 28, the space in between same being either an air-space or a space filled with mineral wool or other non-conductor of cold, so as to prevent the sweating of the cereal as it emerges from the heated tubes 6. The hopper 26 will be suitably connected at 29 to a run or conveyer. Within the hopper 26 is located a rotary deflector 30, fixed to the shaft 16, from which it derives its motion. As the tendency of grain or like article is to run from the center, so as to leave a hollow cone, I have provided a pair of arms 31 and 32, the former projecting upwardly within the hopper 26 and the latter downwardly within the same, as clearly shown in Fig. 2, to act as stirrers for the part of the product adjacent to the wall 27 of the hopper 26, same rotating with the conical deflector 30. The hopper 26 is surmounted by a plate 33, having a flange 34, by which it is riveted to the casing 1, said plate 33 closing the bottom of the steam-space 3 and preventing the water of condensation from entering the hopper 26. The water of condensation has its exit through the pipe 35.

It will be observed that the arms 31 and 32 are of the peculiar angular shape illustrated in Fig. 2 and project, first, in a right line from the deflector 30, then at an angle of ninety degrees, and then at a less angle, and overlap the lowest portion of the casing 1, so as to agitate the material in the hopper 26 when the same is completely filled up to the plate 33. The hopper 26 is securely fastened to the casing 1 by the bolts 37, fastened by thumb-nuts 38.

The operation of the vertically-reciprocating agitators 7 is produced by the shaft 13, to the ends of which are fixed the disks 39, having connecting-rods 40 eccentrically attached thereto at 41. At their other ends said connecting-rods 40 are attached to the carrier board or frame 42, to which are bolted or otherwise fixed the depending rods 43, into the ends of which are let in and soldered the ends of the spiral wires 7. As will be evident, when the shaft 13 rotates the disks 39 revolve with it, and by reason of the eccentric connection therewith of the connecting-rods 40 the board or frame 42 is given a vertically-reciprocating motion, which is naturally imparted to the wires 7. The motion of the spiral wires 7 is not, however, that of rapid reciprocation, but rather consists, first, of a step-by-step movement in one direction and then, second, of a step-by-step movement in the other direction. This is caused by the fact that the rocking arm 44, which is loosely mounted upon shaft 13 and held from lateral displacement thereon by the block 45, which holds it in engagement with the ratchet 46, imparts motion to the shaft 13 by means of the engagement of the pawl 47 with the teeth of the ratchet 46 (the latter being fixed to the shaft 13) by the pawl 47 pushing the ratchet 46 in the direction indicated by the arrow in Fig. 1, the degree of movement thus imparted to the ratchet being predetermined by the adjustment of the connecting-rod 48 in the slot 49 by means of the adjusting-screw 50, so that the pawl 47, attached in the usual manner to the arm 44, may push the ratchet 46 forward a distance equal to one, two, or more notches on said ratchet.

The operation of the moving parts is as follows: When the band-wheel 51 is rotated, it revolves the shaft 52, bearing the slotted arm 53, in which the end of the connecting-rod 48 has been adjusted, and thus pulls the arm 48 to the right in Fig. 1, thus actuating the arm 44 and causing the pawl 47 to push against one of the teeth of the ratchet 46, and thus to rotate the shaft 13, and with it the disks 39, a predetermined distance proportioned to the length of one or more teeth on the ratchet 46. This causes the eccentrics 41 to travel, and with them the connecting-rods 40, which, according to the relative position of said eccentric 41, either raises or depresses the carrier board or frame 42, and with it the agitators 7. If in this manner nine movements of the pawl 47 are required so to rotate the shaft 13 that the eccentrics 41 are raised to the highest position on disks 39, then nine partial movements will be made by the agitators 7 within the tubes 6 before they have traveled the greatest possible distance in their ascent. When the eccentrics 41 pass the highest position and begin their descent in the revolution of the disks 39, the agitators 7 are also depressed and in the illustration used above will reach their lowest point of travel at the end of nine partial movements. At the same time that the eccentrics 39 on shaft 13 thus cause the movement of the agitators 7 the gear 20, also on shaft 13, by meshing with the gear 19 on vertical shaft 16 causes the rotation of the latter, and with it the rotation of the deflectors 15 and 30 and arms 31 and 32. Retrogressive motion by ratchet 46 is prevented by stop 54, pivoted to standard 55.

Having thus described my said invention, what I claim, and desire to secure by Letters Patent, is—

1. In a machine of the character described, the combination of a casing providing a heat-space, means located within same for the passage of the article to be sterilized, means within the latter for agitating the article undergoing sterilization, said agitating means consisting of a reciprocating spiral wire, and means for reciprocating said agitators.

2. In a machine of the character described, a heat-container, feed means for passing the article to be sterilized therethrough, agitators operating within said feed means, said agitators consisting of reciprocating spiral wires, and means for reciprocating said wires.

3. In a machine of the character described, the combination of a casing acting as a heat-container, grain-feed tubes passing therethrough, traveling agitators located in said tubes, said agitators consisting of spiral wires, and means for imparting motion to said agitators.

4. In a machine of the character described, the combination of a heat-container, individual grain-feeds spaced apart located therein, individual reciprocating agitators consisting of spiral wires passing through said grain-feeds, and means for imparting motion to said agitators whereby the same travel by a step-by-step movement, first in one direction, and then in the other.

5. In a machine of the character described, the combination of a feed-hopper and an exit-hopper, a casing consisting of a heat-container located between said hoppers, a portion above said heat-container acting as a grain-container, a plurality of tubes communicating between said grain-container and said exit-hopper, and said tubes being so disposed as to have a heat-space surrounding each, a spiral wire located in each of said tubes and acting as an agitator to bring all parts of the grain being sterilized equally into contact with the heat, and means for imparting reciprocating motion to said agitators.

6. In a machine of the character described, the combination of a heat-container, feed means for passing the article to be sterilized therethrough, and agitators operating within said feed means, which agitators are each formed of a spiral wire which passes completely through said feed means from end to end.

7. In a machine of the character described the combination of a heat-container, feed means for passing the article to be sterilized therethrough, and agitators operating within said feed means, which agitators are formed of a spiral wire which passes completely through said feed means from end to end and projects slightly beyond said feed means at least at one end.

8. In a machine of the character described, the combination of a heat-container, feed means for passing the article to be sterilized therethrough, agitators operating within said means, said agitators having a spiral form, whereby the material acted upon in all its parts is caused to get in contact with the heating-surface, and means for moving said agitators.

9. In a machine of the character described, the combination of a feed-hopper and an exit-hopper, a casing constituting a heat-container located between said hoppers, a portion above said heat-container acting as a grain-container, a plurality of tubes communicating between said grain-container and said exit-hopper, said tubes being so disposed as to have a heat-space surrounding each, and a pair of spreaders underneath said feed-hopper, one of same being rotary, and the other stationary, the stationary one terminating in a sleeve which projects above the lowest line of the upper one.

10. In a machine of the character described, the combination of a casing, in its lower portion constituting a heat-container, and in its upper portion a cereal-container, an exit-hopper beneath said heat-container, means communicating with said exit-hopper from said cereal-container passing through said heat-container, and a rotary shaft passing through said cereal-container and said heat-container, and projecting into said exit-hopper, a deflector being mounted upon that part of said shaft extending into the exit-hopper and rotating therewith.

11. In a machine of the character described, the combination of a casing, in its lower portion constituting a heat-container, and in its upper portion a cereal-container, an exit-hopper beneath said heat-container, means communicating with said exit-hopper from said cereal-container passing through said heat-container, a rotary shaft passing through said cereal-container and said heat-container, and projecting into said exit-hopper, a deflector being mounted upon that part of said shaft extending into the exit-hopper and rotating therewith, and one or more arms borne by said deflector and rotating therewith.

12. In a machine of the character described, the combination of a casing, in its lower portion constituting a heat-container, and in its upper portion a cereal-container, an exit-hopper beneath said heat-container, means communicating with said exit-hopper from said cereal-container passing through said heat-container, a rotary shaft passing through said cereal-container and said heat-container, and projecting into said exit-hopper, a deflector being mounted upon that part of said shaft extending into the exit-hopper and rotating therewith, and a pair of arms borne by said deflector and rotating therewith, one of same projecting upwardly from said deflector, and the other downwardly therefrom.

13. In a machine of the character described, the combination of a casing, in its lower portion constituting a heat-container, and in its upper portion a cereal-container, an exit-hopper beneath said heat-container, means communicating with said exit-hopper from said cereal-container passing through said heat-container, a rotary shaft passing through said cereal-container and said heat-container, and projecting into said exit-hopper, a deflector being mounted upon that part of said shaft extending into the exit-hopper and rotating therewith, and a pair of arms borne by said deflector and rotating therewith, one of same projecting upwardly from said deflector, and the other downwardly therefrom, said upwardly-projecting arm overlapping by a straight extension the lowest portion of the wall of said casing.

14. In a machine of the character described, the combination of a heat-container, a plurality of tubular grain-feeds spaced apart located therein, individual reciprocating agitators passing through said grain-feeds, said agitators each consisting of a spiral wire, and means for imparting motion to said agitators.

15. In a machine of the character described, the combination of a heat-container, a plurality of tubes located within same for feeding the article to be sterilized therethrough, an agitator located within each of said tubes, means for holding each of said agitators in fixed relation to its respective tube, an operating-shaft, an eccentric means fixed to said shaft and connected to said means for holding said agitators for imparting movement to the same, and means for rotating said shaft.

16. In a machine of the character described, the combination of a heat-container, a plurality of tubes located within same for feeding the article to be sterilized therethrough, an agitator located within each of said tubes, means for holding each of said agitators in fixed relation to its respective tube, an operating-shaft, an eccentric means fixed to said shaft and connected to said means for holding said agitators for imparting movement to the same, means for rotating said shaft, said means comprising a ratchet fixed to said operating-shaft, a rocking arm loosely mounted on said shaft and in juxtaposition to said ratchet, said arm bearing a pawl adapted to engage the teeth of said ratchet, and means for imparting motion to said rocking arm.

17. In a machine of the character described, the combination of a heat-container, a plurality of tubes located within same for feeding the article to be sterilized therethrough, an agitator located within each of said tubes, means for holding each of said agitators in fixed relation to its respective tube, an operating-shaft, an eccentric means fixed to said shaft and connected to said means for holding said agitators for imparting movement to the same, means for rotating said shaft, said means comprising a ratchet fixed to said operating-shaft, a rocking arm loosely mounted on said shaft and in juxtaposition to said ratchet, said arm bearing a pawl adapted to engage the teeth of said ratchet, and means for imparting motion to said rocking arm, said means for rocking said arm consisting of a shaft suitably actuated and bearing a slotted arm fixed thereto, the slot therein providing means for adjustment of the scope of motion of said rocking arm.

18. In a machine of the character described, the combination of a casing, forming in one portion a heat-container, and in the other a grain-container, means passing through the heat-container for passing the grain therethrough, an exit-hopper located underneath said heat-container, a vertical rotary shaft passing through said grain-container and through said heat-container and into said exit-hopper, a deflector located in said exit-hopper and adapted to rotate with said shaft, a rotary spreader also mounted upon said shaft and located within said grain-container, agitators located within the means for conveying the grain from the grain-container to the exit-hopper and through the heat-container, said agitators having motion imparted to them from an operating-shaft, said operating-shaft also having means mounted thereon, engaging means mounted upon said vertical shaft whereby the latter is rotated by the same operating-shaft that actuates the agitators.

In testimony whereof I have affixed my signature in presence of two witnesses.

ELWIN I. NOXON.

Witnesses:
M. E. JOHNSON,
GLADYS WALTON.